US012296439B2

(12) United States Patent
Cranford

(10) Patent No.: US 12,296,439 B2
(45) Date of Patent: May 13, 2025

(54) WRENCH DEVICE FOR PUSH-TO-CONNECT FITTING

(71) Applicant: Applied System Technologies, Inc., Charlotte, NC (US)

(72) Inventor: Seth S. Cranford, Matthews, NC (US)

(73) Assignee: Applied System Technologies, Inc., Charlotte, NC (US)

( * ) Notice: Subject to any disclaimer, the term of this patent is extended or adjusted under 35 U.S.C. 154(b) by 307 days.

(21) Appl. No.: 17/873,467

(22) Filed: Jul. 26, 2022

(65) Prior Publication Data

US 2024/0033882 A1 Feb. 1, 2024

(51) Int. Cl.
*B25B 13/08* (2006.01)
*B25B 23/16* (2006.01)

(52) U.S. Cl.
CPC .............. *B25B 13/08* (2013.01); *B25B 23/16* (2013.01)

(58) Field of Classification Search
CPC ......... B25B 13/02; B25B 13/08; B25B 13/48; B25B 27/14; B25B 23/16
USPC .......................................... D8/17, 21, 27, 28
See application file for complete search history.

(56) References Cited

U.S. PATENT DOCUMENTS

D47,977 S * 10/1915 White .............................. D8/28
1,802,832 A * 4/1931 Priddle ................... B25B 13/08 81/186
2,161,163 A * 6/1939 Hedgpeth ............... B44B 5/026 40/913
2,196,701 A * 4/1940 Homsher ................ B25B 13/04 7/157
2,421,665 A * 6/1947 Umbdenstock ......... B25B 13/48 81/176.15
2,687,056 A * 8/1954 Foor ....................... B25B 13/08 81/125.1
2,705,433 A * 4/1955 Goldman ................ B25B 13/56 81/177.1
3,447,405 A * 6/1969 Zahuranec ............ B25B 23/105 81/119
3,858,464 A * 1/1975 Evans ..................... B25B 13/46 81/186
3,921,475 A * 11/1975 Evans ..................... B25B 13/08 81/119
3,931,749 A * 1/1976 Evans ..................... B25B 13/08 81/186
D272,036 S * 1/1984 Richardson ...................... D8/28
(Continued)

FOREIGN PATENT DOCUMENTS

DE 20102494 U1 * 8/2001 ............. B25B 13/08
GB 2447989 A * 10/2008 ............. B25B 13/08

*Primary Examiner* — David B. Thomas
(74) *Attorney, Agent, or Firm* — Seth L. Hudson; Maynard Nexsen PC

(57) ABSTRACT

A wrench device that includes a first head with fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. A second head with fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. An elongated handle is engaged to the first head and the second end.

20 Claims, 3 Drawing Sheets

(56) References Cited

U.S. PATENT DOCUMENTS

| | | | | | |
|---|---|---|---|---|---|
| 5,136,902 | A * | 8/1992 | Ma | B25B 13/14 81/119 |
| D418,727 | S * | 1/2000 | Hsieh | D8/28 |
| D441,263 | S * | 5/2001 | Hasenberg | D8/28 |
| D448,981 | S * | 10/2001 | Solanki | D8/28 |
| D473,436 | S * | 4/2003 | Pilatzke | D8/28 |
| D519,009 | S * | 4/2006 | Hsieh | D8/27 |
| D541,120 | S * | 4/2007 | Chaconas | 81/119 |
| D675,076 | S * | 1/2013 | Oachs | D8/17 |
| D686,474 | S * | 7/2013 | Christopher | D8/28 |
| 8,613,240 | B2 * | 12/2013 | Feraud | B25G 1/102 81/57.36 |
| 9,149,915 | B1 * | 10/2015 | Sparks | B25B 13/481 |
| 9,616,553 | B2 * | 4/2017 | Marovets | B25B 13/08 |
| 10,406,657 | B2 * | 9/2019 | Marovets | B25B 13/08 |
| D861,444 | S * | 10/2019 | Crozier | D8/27 |
| 10,882,163 | B2 * | 1/2021 | Sweeney | B25B 13/50 |
| D913,762 | S * | 3/2021 | Sweeney | B25B 13/50 D8/27 |
| 11,040,432 | B2 * | 6/2021 | Amash | B25B 13/08 |
| 11,135,702 | B2 * | 10/2021 | Su | B25B 13/5058 |
| 11,154,966 | B1 * | 10/2021 | Del Giudice | B25G 1/102 |
| D939,300 | S * | 12/2021 | Mitchell | D8/21 |
| 11,673,236 | B2 * | 6/2023 | Negron | B25B 23/12 81/125.1 |
| 11,701,756 | B2 * | 7/2023 | Abel | B25B 13/18 81/129 |
| 2005/0022631 | A1 * | 2/2005 | Brazil | B25B 13/04 81/119 |
| 2016/0375558 | A1 * | 12/2016 | Liau | B25B 13/04 81/119 |
| 2017/0252903 | A1 * | 9/2017 | Marovets | G09F 3/00 |
| 2020/0122303 | A1 * | 4/2020 | Amash | B25B 13/08 |
| 2020/0298381 | A1 * | 9/2020 | Chen | B25B 23/0007 |
| 2020/0309299 | A1 * | 10/2020 | Williams | B25B 27/10 |
| 2021/0276161 | A1 * | 9/2021 | Amash | B23K 26/0876 |
| 2022/0080559 | A1 * | 3/2022 | Negron | B25B 23/12 |

* cited by examiner

WRENCH DEVICE FOR PUSH-TO-CONNECT FITTING

FIELD OF THE INVENTION

The present invention relates generally to a wrench for use with push-to-connect fittings and more generally relates to a dual head wrench, wherein each head on the wrench is designed to engage a different sized push-to-connect fitting and a kit composed of a plurality of dual head wrenches.

BACKGROUND OF THE INVENTION

Push-to-connect fittings are utilized in gas or liquid fluid flow systems to provide a tight mechanical connection between a conduit, and another device, such as another conduit that are easy to remove and quick to connect. These fittings are similar to standard compression fittings, but contain a resilient o-ring and a grip ring to hold the conduit in place. However, a tool, such as a wrench, must still be used to tighten or loosen a component of the push-to-connect fitting, especially for gas flow systems and/or a fitting that is located in a hard to reach location. It is an object of the present invention to provide an appropriate tool for tightening and loosening push-to-connect fittings.

BRIEF SUMMARY OF THE INVENTION

According to an embodiment of the present invention, a wrench device includes a first head, a second head, and an elongated handle having a first end and a second end, the first end is engaged to the first head and the second end is engaged to the second head. The angle formed at the intersection of a longitudinal axis of the elongated handle and a longitudinal axis of the first head is greater than 90 degrees and the angle formed at the intersection of a longitudinal axis of the elongated handle and a longitudinal axis of the second head is greater than 90 degrees.

According to another embodiment of the present invention, the wrench device includes a first head with fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. A second head with fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. An elongated handle with a first end and a second end, the first end is engaged to the first head and the second end is engaged to the second head, the angle formed at the intersection of a longitudinal axis of the elongated handle and a longitudinal axis of the first head is greater than 90 degrees. The angle formed at the intersection of a longitudinal axis of the elongated handle and a longitudinal axis of the second head is greater than 90 degrees.

According to yet another embodiment of the present invention, a method for tightening or loosening a push-to connect fitting that includes providing a push-to-connect fitting and a wrench that comprises a first head that includes fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. A second head that includes fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting. An elongated handle has a first end and a second end, the first end is engaged to the first head and the second end is engaged to the second head, the angle formed at the intersection of a longitudinal axis of the elongated handle and a longitudinal axis of the first head is greater than 90 degrees and the angle formed at the intersection of a longitudinal axis of the elongated handle and a longitudinal axis of the second head is greater than 90 degrees. The fitting engaging cavity of the first head or the fitting engaging cavity of the second head is engaged to a push to connect fitting and the wrench is rotated.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
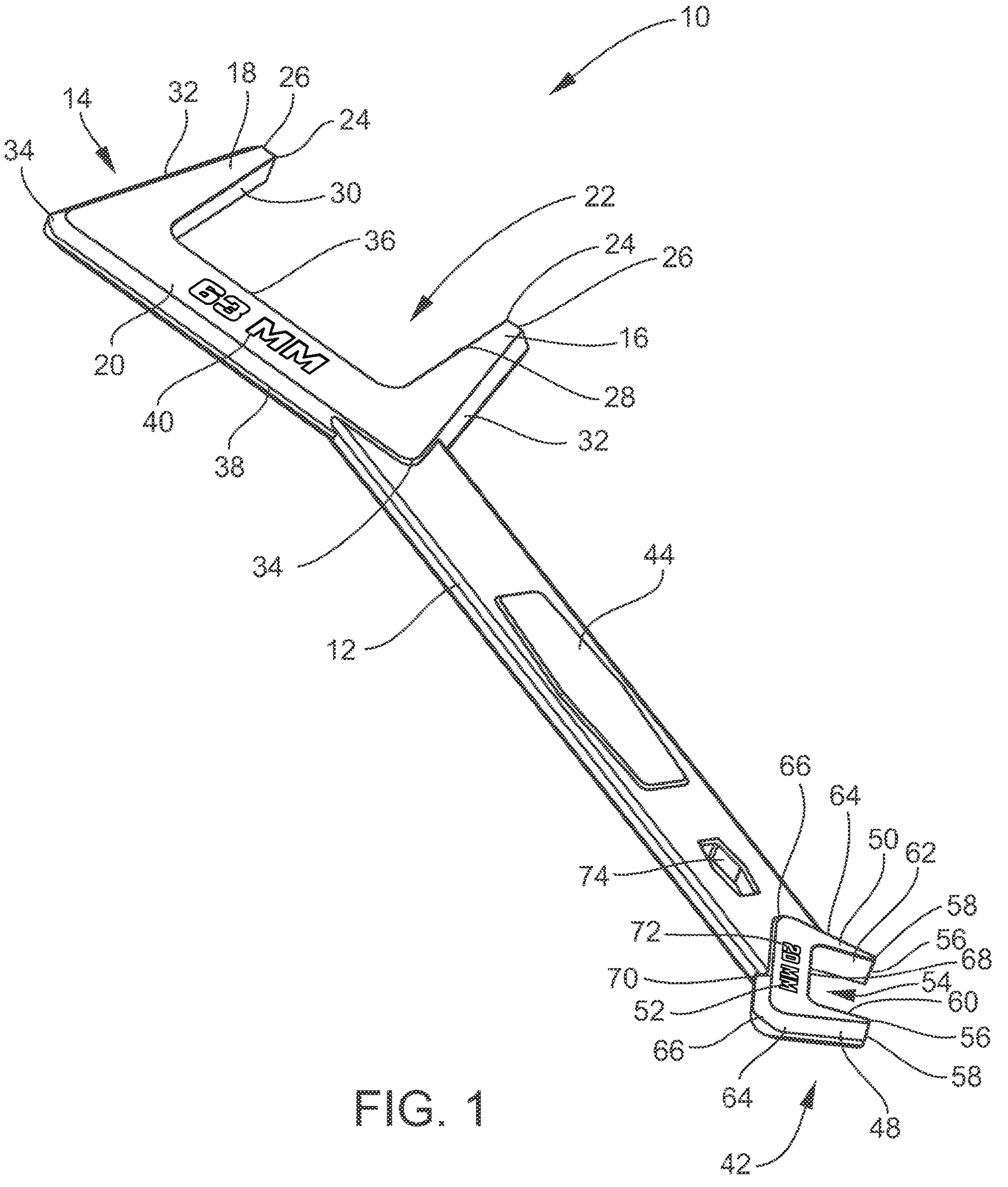
FIG. 1 is a perspective view of an exemplary embodiment of the wrench of the present invention.
Figure 2:
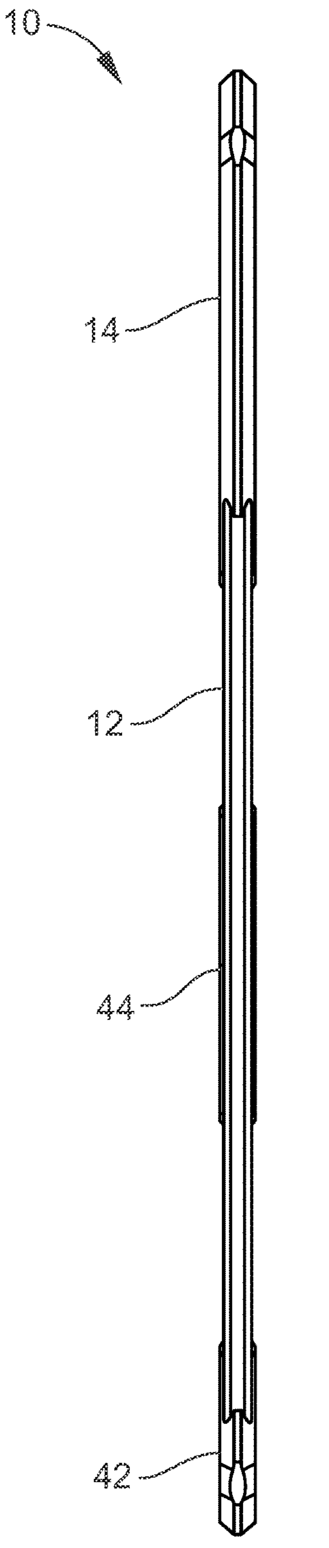
FIG. 2 is a side view of an exemplary embodiment of the wrench of the present invention.

Referring now specifically to the drawings, a wrench device is illustrated in FIG. 1 and is shown generally at reference numeral 10. The wrench device 10 contains an elongate handle 12 having a first end and a second end. The first end of the wrench device 10 is engaged to a first head 14. The first head 14 contains fixed jaws 16, 18 and a neck 20 disposed between the fixed jaws 16, 18 for positioning the fixed jaws 16, 18 in a spaced-apart arrangement. An open-ended push-to-connect fitting engaging cavity 22 is disposed within the fixed jaws 16, 18 and neck 20 for receiving a push-to-connect fitting. In other words, a cavity 22 with an opening on the end of the cavity so that the cavity can receive a push-to-connect fitting, or the like, of the same basic size as the cavity 22.

The cavity 22 is bounded on the upper end by front corners 24. The front corners 24 are disposed on the end portion of the fixed jaws 16, 18 that face outward from the elongated handle 12 and adjacent the cavity 22. In other words, the front corners 24 are disposed on the end portion of the fixed jaws 16, 18 not adjacent the neck 20 and adjacent or facing the cavity 22. The front corners 24 of the fixed jaws 16, 18 form the entrance to the cavity 22. Each front corner 24 is formed by the intersection of a flat portion 26 and a respective side engaging surface 28, 30. The intersection results in a front corner 24 that has an edge, from the front side to the back side of each fixed jaw 16, 18. The flat portion 26 intersects the respective side engaging surface 28, 30, and the angle between the flat portion 26 and the respective side engaging surface 28, 20 is preferably an angle of between about 80° to about 100°, and more preferably an angle of about 90°, resulting the in the edge of the front corner 24. As illustrated the front corner 24 on the fixed jaw 16 is formed from the intersection of the flat portion 26 and the side engaging surface 28, and the front corner 24 on the fixed jaw 18 is formed from the intersection of the flat portion 26 and the side engaging surface 30.

The side engaging surface 28 is disposed on fixed jaw 16, and the side engaging surface 30 is disposed on fixed jaw 18. The side engaging surfaces 28, 30 oppose each other in a parallel relationship to provide gripping of a portion of a push-to-connect fitting inserted between the fixed jaws 16, 18. A rear engaging surface 32 is disposed on the fixed jaws 16, 18 opposite the side engaging surfaces 28, 30. Rear corners 34 are disposed opposite the front corners 24 on the flat portion 26. Each rear corner 34 is formed by the intersection of the flat portion 26 and the rear engaging surface 32. The intersection results in a rear corner 34 that has an edge, from the front side to the back side of each fixed jaw 16, 18. The rear corners 34 are disposed on the end portion of the fixed jaws 16, 18 that face outward from the elongated handle 12.

The fixed jaws 16, 18 increase in length, wherein length refers to the distance between the rear engaging surface 32 to the respective side engaging surface 28, 30. The fixed jaws increase in length from its upper end containing the flat portion 26 to its lower end that intersects with the neck 20. The neck 20 contains an inner edge 36 and a back edge 38. The inner edge 36 forms the back end of the cavity 22, opposite the open end, and in a perpendicular relationship with each side engaging surface 28, 30. Side engaging surface 28 intersects the inner edge 36 at a first end, and side engaging surface 30 intersects the inner edge 36 at the second end. The angle formed by the intersection of the first end of the inner edge 36 and the side engaging surface 28 is preferably between about 80° to 100°, and more preferably about 90°. The angle formed by the intersection of the second end of the inner edge 36 and the side engaging surface 30 is preferably between about 80° to 100°, and more preferably about 90°. The inner corners defined by the intersection of the inner edge 36 and the side engaging surfaces 28, 30 are preferably rounded or have a radius of curvature for receiving a portion of the push-to-connect fitting.

A portion of the neck 20 is engaged to the elongated handle 12, wherein the first head 14 is angled with respect to the longitudinal axis of the elongated handle 12. In other words, an angle is formed by an intersection between the longitudinal axis of the elongated handle 12 and the longitudinal axis of the first head 14. This angle is greater than 90°, but less than 180°. This angle between the longitudinal axis of the elongated handle 12 and the longitudinal axis of the first head 14, in addition to the positioning of the first head 14 on the elongated handle 12, allows the wrench 10 to access a push-to-connect fitting in a tight space and provides additional clearance for rotating the wrench 10. As illustrated, only a portion of the neck 20 of the first head 14 is engaged to the elongated handle 12. Specifically, the elongated handle 12 is engaged to a rear corner 34 adjacent fixed jaw 16 and the adjacent neck area. The opposite rear corner 34 adjacent fixed jaw 18 is not engaged to the elongated handle 12.

Figure 3:
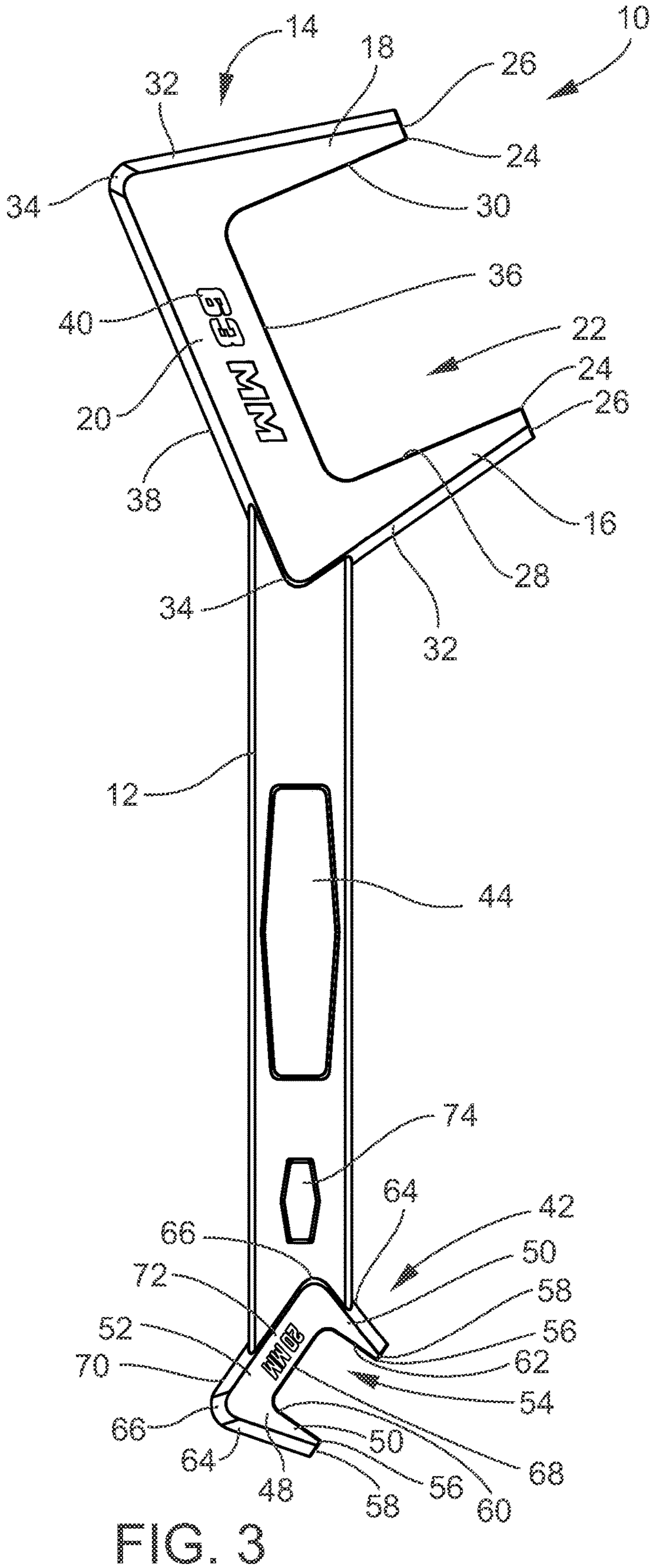
FIG. 3 is a top view of an exemplary embodiment of the wrench of the present invention.
Figure 4:
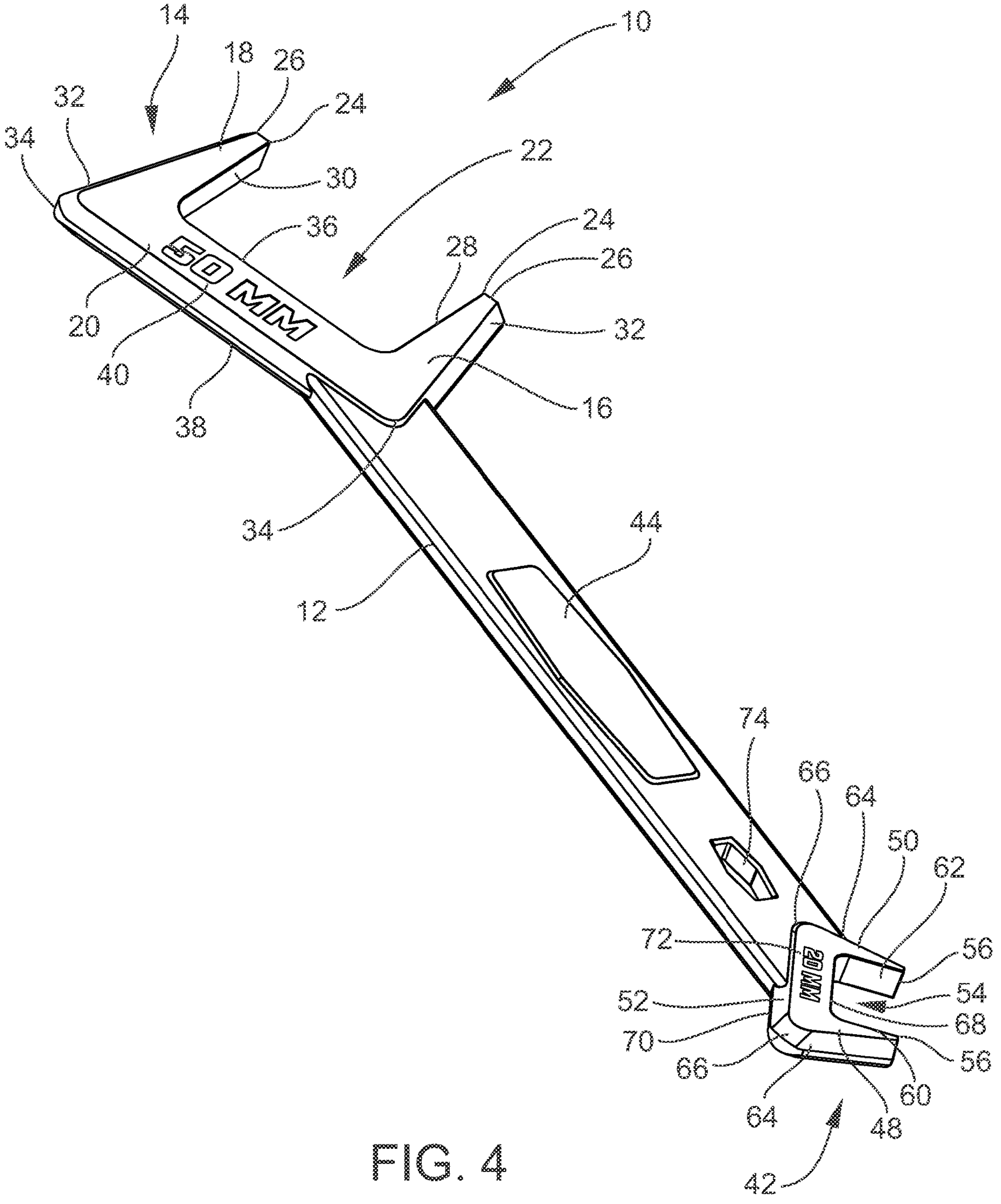
FIG. 4 is a perspective view of an exemplary embodiment of the wrench with a different sized first head than the wrench illustrated in FIGS. 1-3.

Indicia 40 may be included on or within the first head 14. The indicia 40 may be in the form of text, symbols, and/or colors. The text, symbols, and/or colors may be molded, imprinted, and/or marked on or within the surface of the first head 14. As illustrated in FIGS. 1, 3, and 4, the indicia 40 comprises text indicating the type of push-to-connect fitting the cavity 22 of the first head 14 is designed to engage.

The elongated handle 12 has a front side, a back side, a first end engaged to the first head 14, and a second end is engaged to a second head 42. The elongated handle 12 may contain an indicia marking portion 44 which is a raised structure at a height above the remaining surface of the elongated handle 12. The indicia marking portion 44 is raised above the surface of the elongated handle 12 and has a different elevation that the remaining surface of the elongated handle 12. The indicia marking portion 44 may be positioned on the front side, back side, or front side and back side of the elongated handle 12. Indicia is designed to be positioned on or within the indicia marking portion 44. The indicia may be in the form of text, symbols, and/or colors. The text, symbols, and/or colors may be molded, imprinted, and/or marked on the surface or within the indicia marking portion 44. The indicia may contain a company name, trademark, logo and the like.

The elongated handle 12 also includes an opening 74. As illustrated, the opening 74, as shown in FIGS. 1, 3, and 4, is an elongate opening disposed between the first end and second end of the elongated handle 12. A first end and a second end of the opening 74 has width, a central portion of the opening 74 has a width greater than the width of the first and second end. The opening 74 extends from the front side to the back side of the elongated handle 12. The opening 74 is designed to receive a hook on a tool belt for allowing a user to easily carry and access the wrench 10. As illustrated, the opening 74 may be adjacent the second head 42. Alternatively, the opening 74 may be adjacent the first head 14 or positioned at any location within the elongated handle 12. While only one opening 74 is illustrated, the invention contemplates two or more openings 48 positioned within the elongated handle 12, or a plurality of openings 48 positioned within the elongated handle 12.

The second head 42 contains fixed jaws 48, 50 and a neck 52 disposed between the fixed jaws 48, 50 for positioning the fixed jaws 48, 50 in a spaced-apart arrangement. An open-ended push-to-connect fitting engaging cavity 54 is disposed within the fixed jaws 48, 50 and neck 52 for receiving a push-to-connect fitting. In other words, a cavity 54 with an opening on the end of the cavity 54 so that the cavity 54 can receive a push-to-connect fitting, or the like, of the same basic size as the cavity 54.

The cavity 54 is bounded on the upper end by front corners 56. The front corners 56 are disposed on the end portion of the fixed jaws 16, 18 that face outward from the elongated handle 12 and adjacent the cavity 54. In other words, the front corners 56 are disposed on the end portion of the fixed jaws 16, 18 not adjacent the neck 20 and adjacent or facing the cavity 54. The front corners 56 of the fixed jaws 16, 18 form the entrance to the cavity 54. Each front corner 56 is formed by the intersection of a flat portion 58 and a respective side engaging surface 60, 62. The intersection results in a front corner 56 that has an edge, from the front side to the back side of each fixed jaw 16, 18. The flat portion 58 intersects the respective side engaging surface 60, 62, and the angle between the flat portion 58 and the respective side engaging surface 60, 20 is preferably an angle of between about 80° to about 100°, and more preferably an angle of about 90°, resulting the in the edge of the front corner 56. As illustrated, the front corner 56 on the fixed jaw 16 is formed from the intersection of the flat portion 58 and the side engaging surface 60, and the front corner 56 on the fixed jaw 18 is formed from the intersection of the flat portion 58 and the side engaging surface 62.

The side engaging surface 60 is disposed on fixed jaw 16, and the side engaging surface 62 is disposed on fixed jaw 18. The side engaging surfaces 60, 62 oppose each other in a parallel relationship to provide gripping of a portion of a push-to-connect fitting inserted between the fixed jaws 16, 18. A rear engaging surface 64 is disposed on the fixed jaws 16, 18 opposite the side engaging surfaces 60, 62. Rear corners 66 are disposed opposite the front corners 56 on the flat portion 58. Each rear corner 66 is formed by the intersection of the flat portion 58 and the rear engaging surface 64. The intersection results in a rear corner 66 that has an edge, from the front side to the back side of each fixed jaw 16, 18. The rear corners 66 are disposed on the end portion of the fixed jaws 16, 18 that face outward from the elongated handle 12.

The fixed jaws 16, 18 increase in length, wherein length refers to the distance between the rear engaging surface 64 to the respective side engaging surface 60, 62. The fixed jaws increase in length from its upper end containing the flat portion 58 to its lower end that intersects with the neck 20. The neck 20 contains an inner edge 68 and a back edge 70. The inner edge 68 forms the back end of the cavity 54, opposite the open end, and in a perpendicular relationship with each side engaging surface 60, 62. Side engaging surface 60 intersects the inner edge 68 at a first end, and side engaging surface 62 intersects the inner edge 68 at the second end. The angle formed by the intersection of the first end of the inner edge 68 and the side engaging surface 60 is preferably between about 80° to 100°, and more preferably about 90°. The angle formed by the intersection of the second end of the inner edge 68 and the side engaging surface 62 is preferably between about 80° to 100°, and more preferably about 90°. The inner corners defined by the intersection of the inner edge 68 and the side engaging surfaces 60, 62 are preferably rounded or have a radius of curvature for receiving a portion of the push-to-connect fitting.

A portion of the neck 20 is engaged to the elongated handle 12, wherein the second head 42 is angled with respect to the longitudinal axis of the elongated handle 12. In other words, an angle is formed by an intersection between the longitudinal axis of the elongated handle 12 and the longitudinal axis of the second head 42. This angle is greater than 90°, but less than 180°. This angle between the longitudinal axis of the elongated handle 12 and the longitudinal axis of the second head 42, in addition to the positioning of the second head 42 on the elongated handle 12, allows the wrench 10 to access a push-to-connect fitting in a tight space and provides additional clearance for rotating the wrench 10. As illustrated, the neck 20 of the second head 42 is engaged to the elongated handle 12 along with a portion of the fixed jaw 50. Specifically, the elongated handle 12 is engaged to rear corner 66 adjacent fixed jaw 50, the adjacent neck 52 area, and the rear engaging surface 64 of fixed jaw 50. The opposite rear corner 66 adjacent fixed jaw 48 is not engaged to the elongated handle 12. Only a portion of the back edge 70 of the neck 52 is engaged to the elongated handle 12 and the remaining portion of the back edge 70 of the neck 52 is not engaged to the elongated handle.

Indicia 72 may be included on or within the first head 14. The indicia 72 may be in the form of text, symbols, and/or colors. The text, symbols, and/or colors may be molded, imprinted, and/or marked on or within the surface of the second head 42. As illustrated in FIGS. 1, 3, and 4, the indicia 72 comprises text indicating the type of push-to-connect fitting the cavity 54 of the second head 42 is designed to engage.

The wrench 10 is preferably composed of metal, such as anodized forged aluminum. The wrench 10 may be produced and sold in a set, wherein at least two or a plurality of wrenches 10 are sold together. In this embodiment, the wrenches 10 may be packaged in a container, pouch or the like. For example, the wrenches may be stored in a drawstring pouch for allowing a user to easily carry and store the wrenches.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A wrench device, comprising:
a first head;
a second head;
an elongated handle having a first end and a second end, the first end is engaged to the first head and the second end is engaged to the second head, an angle formed at the intersection of a longitudinal axis of the elongated handle and a longitudinal axis of the first head is greater than 90 degrees and the angle formed at the intersection of a longitudinal axis of the elongated handle and a longitudinal axis of the second head is greater than 90 degrees; and
an opening within the elongated handle, extending from a front side to a back side, a first end and a second end of the opening has width, a central portion of the opening has a width greater than the width of the first and second end, wherein the opening is disposed closer to the second end of the elongated handle than the first end of the elongated handle.

2. The wrench device according to claim 1, wherein the first head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting.

3. The wrench device according to claim 1, wherein the second head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting.

4. The wrench device according to claim 1, wherein the first head comprises fixed jaws and a neck disposed between the fixed jaws for positioning the fixed jaws in a spaced-apart arrangement, and a cavity disposed within the fixed jaws and neck, a first side engaging surface is disposed on a fixed jaw, and a second side engaging surface is disposed on the opposite fixed jaw, wherein the side engaging surfaces are opposed to each other in a parallel relationship to provide gripping for a fitting inserted between the fixed jaws, rear engaging surfaces are disposed on the fixed jaws and opposite the side engaging surfaces, the distance between the rear engaging surface to the respective side engaging surface of each fixed jaw increases from an upper end to a lower end that intersects with the neck.

5. The wrench device according to claim 1, where the wrench is composed of anodized forged aluminum.

6. The wrench device according to claim 1, wherein the first head contains a cavity and the second head contains a cavity, the cavity of the first head is larger than the cavity of the second head.

7. The wrench device according to claim 1, further comprising an indicia marking portion disposed on the elongated handle.

8. The wrench device according to claim 1, wherein the opening defines a hexagonal cross-section.

9. A wrench device, comprising:

a first head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting;

a second head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting;

an elongated handle having a first end and a second end, the first end is engaged to the first head and the second end is engaged to the second head, an angle formed at the intersection of a longitudinal axis of the elongated handle and a longitudinal axis of the first head is greater than 90 degrees and the angle formed at the intersection of a longitudinal axis of the elongated handle and a longitudinal axis of the second head is greater than 90 degrees; and an opening within the elongated handle, extending from a front side to a back side, a first end and a second end of the opening has width, a central portion of the opening has a width greater than the width of the first and second end, wherein the opening is disposed closer to the second end of the elongated handle than the first end of the elongated handle.

10. The wrench device according to claim 9, wherein the first head comprises fixed jaws and a neck disposed between the fixed jaws for positioning the fixed jaws in a spaced-apart arrangement, and a cavity disposed within the fixed jaws and neck, a first side engaging surface is disposed on a fixed jaw, and a second side engaging surface is disposed on the opposite fixed jaw, wherein the side engaging surfaces are opposed to each other in a parallel relationship to provide gripping for a fitting inserted between the fixed jaws, rear engaging surfaces are disposed on the fixed jaws and opposite the side engaging surfaces, the distance between the rear engaging surface to the respective side engaging surface of each fixed jaw increases from an upper end to a lower end that intersects with the neck.

11. The wrench device according to claim 9, where the wrench is composed of anodized forged aluminum.

12. The wrench device according to claim 9, wherein the first head contains a cavity and the second head contains a cavity, the cavity of the first head is larger than the cavity of the second head.

13. The wrench device according to claim 9, further comprising an indicia marking portion disposed on the elongated handle.

14. The wrench device according to claim 9, wherein the opening defines a hexagonal cross-section.

15. A method for tightening or loosening a push-to connect fitting; comprising:

providing a push-to-connect fitting and a wrench that comprises a first head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting;

a second head comprises fixed jaws and a neck disposed between the fixed jaws for positioning the fixed jaws in a spaced-apart arrangement, and an open-ended push-to-connect fitting engaging cavity is disposed within the fixed jaws and neck for receiving a push-to-connect fitting;

an elongated handle having a first end and a second end, the first end is engaged to the first head and the second end is engaged to the second head, an angle formed at the intersection of a longitudinal axis of the elongated handle and a longitudinal axis of the first head is greater than 90 degrees and the angle formed at the intersection of a longitudinal axis of the elongated handle and a longitudinal axis of the second head is greater than 90 degrees, wherein the elongated handle comprises an opening, the opening extending from a front side to a back side, a first end and a second end of the opening has width, a central portion of the opening has a width greater than the width of the first and second end, wherein the opening is disposed closer to the second end of the elongated handle than the first end of the elongated handle; and engaging the fitting engaging cavity of the first head or the fitting engaging cavity of the second head to a push to connect fitting and rotating the wrench.

16. The method according to claim 15, wherein the first head comprises fixed jaws and a neck disposed between the fixed jaws for positioning the fixed jaws in a spaced-apart arrangement, and a cavity disposed within the fixed jaws and neck, a first side engaging surface is disposed on a fixed jaw, and a second side engaging surface is disposed on the opposite fixed jaw, wherein the side engaging surfaces are opposed to each other in a parallel relationship to provide gripping for a fitting inserted between the fixed jaws, rear engaging surfaces are disposed on the fixed jaws and opposite the side engaging surfaces, the distance between the rear engaging surface to the respective side engaging surface of each fixed jaw increases from an upper end to a lower end that intersects with the neck.

17. The method according to claim 15, where the wrench is composed of anodized forged aluminum.

18. The method according to claim 15, wherein the first head contains a cavity and the second head contains a cavity, the cavity of the first head is larger than the cavity of the second head.

19. The method according to claim 15, further comprising an indicia marking portion disposed on the elongated handle.

20. The method according to claim 15, wherein the opening defines a hexagonal cross-section.

* * * * *